UNITED STATES PATENT OFFICE.

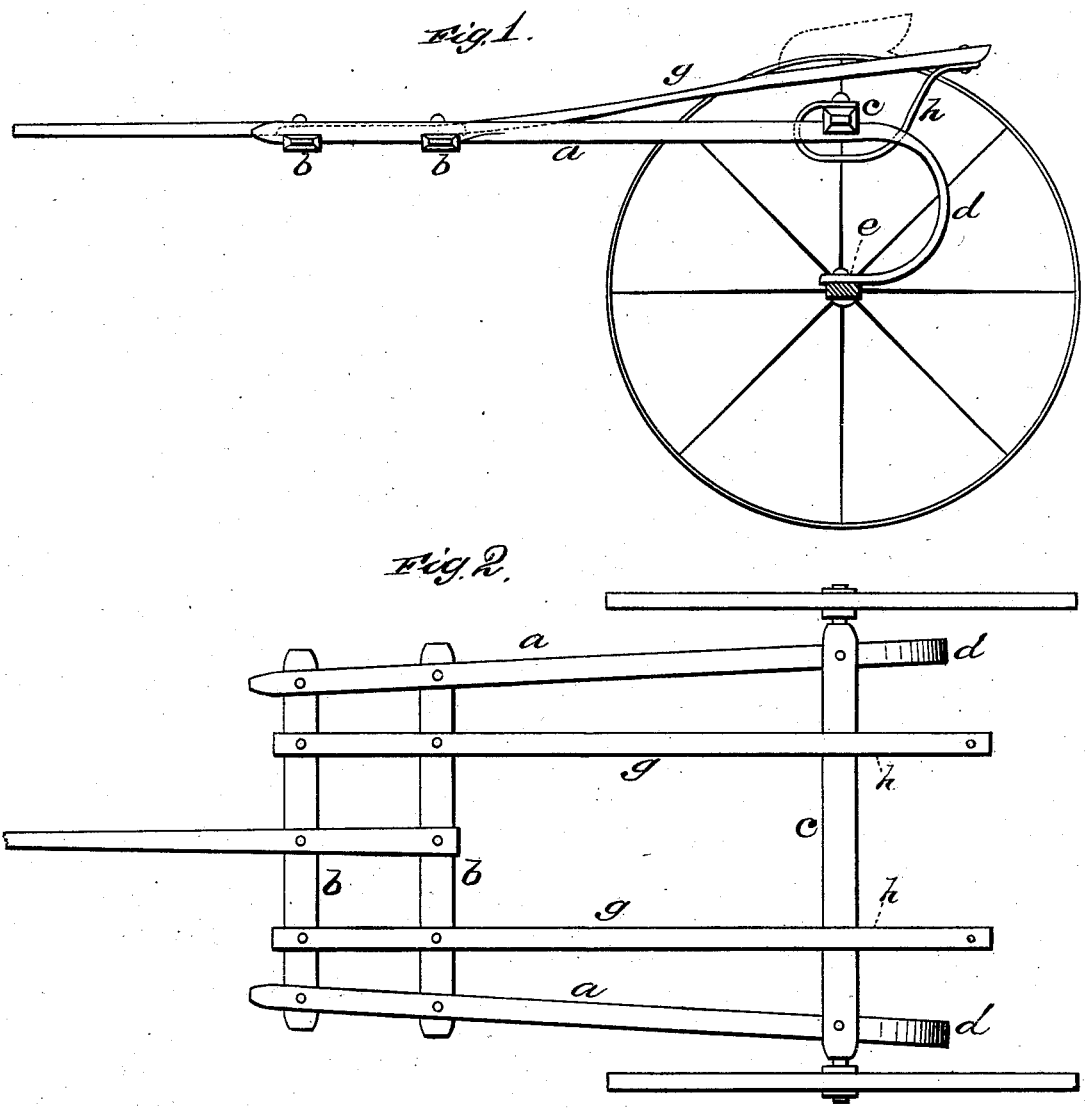

FISHER DOHERTY AND JAMES COLLINS, OF CRAWFORDSVILLE, INDIANA.

SULKY.

SPECIFICATION forming part of Letters Patent No. 259,828, dated June 20, 1882.

Application filed March 11, 1882. (No model.)

*To all whom it may concern:*

Be it known that we, FISHER DOHERTY and JAMES COLLINS, citizens of the United States, and residents of Crawfordsville, in the county of Montgomery and State of Indiana, have invented a new and valuable Improvement in Road Phaetons or Sulkies; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of our improved road phaeton and sulky, and Fig. 2 is a plan or top view of the same.

This invention has relation to the spring-supporting frames of road phaetons or sulkies; and it consists in the construction and novel arrangement of the parts, all as hereinafter set forth, and particularly pointed out in the claim.

The object of this invention is mainly to improve the sulky or road phaeton having two wheels, it being designed to raise the seat and arrange the supporting-bars and springs so that it shall be strongly and durably attached, and at the same time elastic and comfortable.

In the accompanying drawings, the letters $a\ a$ designate the side bars of the supporting-frame, which are connected in front by the transverse bars $b\ b$ and in rear by the transverse bar $c$, which rests on the rear end portions of the side bars. The rear ends, $d$, of the side bars, $a$, are bent downward and under to form springs, which are firmly secured to the axle by means of suitable clips, as at $e$. The bends $d$, when the side bars, $a$, are in a horizontal position, will be in rear of the axle, thereby giving a spring action to this portion of the side bars, which is well adapted to resist the various strains to which they are necessarily subjected.

$g\ g$ represent the inclined spring-bars, the forward ends, $h$, of which are bolted to the front transverse bars, $b\ b$. These bars rise gently as they extend to the rear over the rear transverse bar, $c$, and sufficiently far back to receive the seat, which is secured to the rear ends of the spring-bars. These seat-supporting bars $g$ are in turn supported by springs $h$, which are secured to the transverse bar $c$ and extend to the spring-bars, to which they are also secured.

The shafts or pole of a phaeton supported on a frame of this character will, when geared up, extend horizontally forward in the best position for the draft, and the seat will be raised in position convenient for the occupant as well as comfortable.

A sulky having the rear ends of its shafts bent and attached to the axle in such a manner that the bends rise forward from the axle has had its shafts provided with a single cross-bar in front of the axle, and on this cross-bar the spring or springs which give elasticity to the seat have been secured. The seat-bars in this instance are pivoted to the inner faces of the shafts immediately in front of the cross-bar, and extend rearward over the springs on the cross-bar to the seat. This construction is not, however, claimed herein.

Having described this invention, what we claim, and desire to secure by Letters Patent, is—

In a sulky or road phaeton, the combination, with the bent side bars, $a\ a$, secured by their bent ends $d$ to the axle, and the transverse bars $b\ b\ c$, of the inclined seat-supporting spring-bars $g\ g$, bolted to the bars $b\ b$, and the springs $h$, connecting said spring-bars to the rear transverse bar, substantially as specified.

In testimony that we claim the above we have hereunto subscribed our names in the presence of witnesses.

FISHER DOHERTY.
JAMES COLLINS.

Witnesses:
JOHN E. HUMPHRIES,
GEORGE W. PAUL,
H. B. GARGAN.